(12) United States Patent
Ueda et al.

(10) Patent No.: US 10,800,617 B2
(45) Date of Patent: Oct. 13, 2020

(54) TRANSPORT VEHICLE AND TRANSPORT FACILITY

(71) Applicant: Daifuku Co., Ltd., Osaka-shi (JP)

(72) Inventors: Yuichi Ueda, Hinocho (JP); Masashige Iwata, Hinocho (JP); Akira Emoto, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 16/632,243

(22) PCT Filed: Jul. 13, 2018

(86) PCT No.: PCT/JP2018/026510
§ 371 (c)(1),
(2) Date: Jan. 17, 2020

(87) PCT Pub. No.: WO2019/017294
PCT Pub. Date: Jan. 24, 2019

(65) Prior Publication Data
US 2020/0165082 A1      May 28, 2020

(30) Foreign Application Priority Data

Jul. 20, 2017   (JP) ................................ 2017-140912

(51) Int. Cl.
| | |
|---|---|
| *B65G 65/00* | (2006.01) |
| *B65B 35/40* | (2006.01) |
| *B65G 57/30* | (2006.01) |
| *B65G 61/00* | (2006.01) |

(Continued)

(52) U.S. Cl.
CPC ............ *B65G 65/005* (2013.01); *B65B 35/40* (2013.01); *B65G 1/0435* (2013.01); *B65G 1/065* (2013.01);

(Continued)

(58) Field of Classification Search
CPC ....... B65B 35/40; B65B 2210/02; B65G 1/04; B65G 65/005; B65G 59/06; B65G 35/00;

(Continued)

(56) References Cited

U.S. PATENT DOCUMENTS

| | | | | |
|---|---|---|---|---|
| 3,402,835 A | * | 9/1968 | Saul ..................... | B65G 1/0421 414/273 |
| 4,756,657 A | * | 7/1988 | Kinney ................ | B65G 1/0435 414/280 |

(Continued)

FOREIGN PATENT DOCUMENTS

JP      2004277062 A    10/2004

*Primary Examiner* — Mark A Deuble
(74) *Attorney, Agent, or Firm* — The Webb Law Firm

(57) ABSTRACT

A transport vehicle (2) that travels along a container shelf (1) is provided with a plurality of levels of shelf portions (11) arranged in a vertical direction (Z) and configured to support containers (W), thereby transporting the containers (W). The transport vehicle (2) is provided with a support region (22) where the containers (W) are supported in a stacked state, a transfer apparatus (24) that transfers the containers (W) supported by the shelf portions (11) to the support region (22) and transfers the containers (W) supported in the support region (22) to the shelf portions (11), and a lifting mechanism (25) that lifts a container (W) at any height among a container group (WG) stacked in the support region (22) with respect to a container (W) lower than the container (W) at that any height.

7 Claims, 11 Drawing Sheets

(51) Int. Cl.
*B65G 1/06* (2006.01)
*B65G 1/04* (2006.01)
*B65G 59/06* (2006.01)
B65G 1/137 (2006.01)

(52) U.S. Cl.
CPC ......... *B65G 57/302* (2013.01); *B65G 57/303* (2013.01); *B65G 59/063* (2013.01); *B65G 61/00* (2013.01); *B65B 2210/02* (2013.01); *B65G 1/1375* (2013.01)

(58) Field of Classification Search
CPC ........ B65G 1/00; B65G 57/302; B65G 57/30; B65G 1/0414; B65G 1/0421; B65G 1/0428; B65G 1/0435; B65G 1/06; B65G 1/065; B65G 1/1375; B65G 41/005
See application file for complete search history.

(56) References Cited

U.S. PATENT DOCUMENTS

| | | | |
|---|---|---|---|
| 6,923,612 B2 * | 8/2005 | Hansl | B65G 1/0435 |
| | | | 414/277 |
| 9,850,066 B2 * | 12/2017 | Salichs | B65G 1/06 |
| 10,065,798 B2 * | 9/2018 | Borders | B65G 1/0421 |
| 10,435,252 B1 * | 10/2019 | Hellenbrand | B65G 47/90 |
| 2005/0281641 A1 * | 12/2005 | Maynard | B65G 47/902 |
| | | | 414/273 |
| 2015/0225187 A1 * | 8/2015 | Razumov | B65G 1/065 |
| | | | 414/279 |
| 2016/0207711 A1 * | 7/2016 | Pankratov | B65G 1/1373 |
| 2017/0137221 A1 * | 5/2017 | Koide | H02P 31/00 |
| 2017/0267452 A1 * | 9/2017 | Goren | B65G 1/0492 |

* cited by examiner

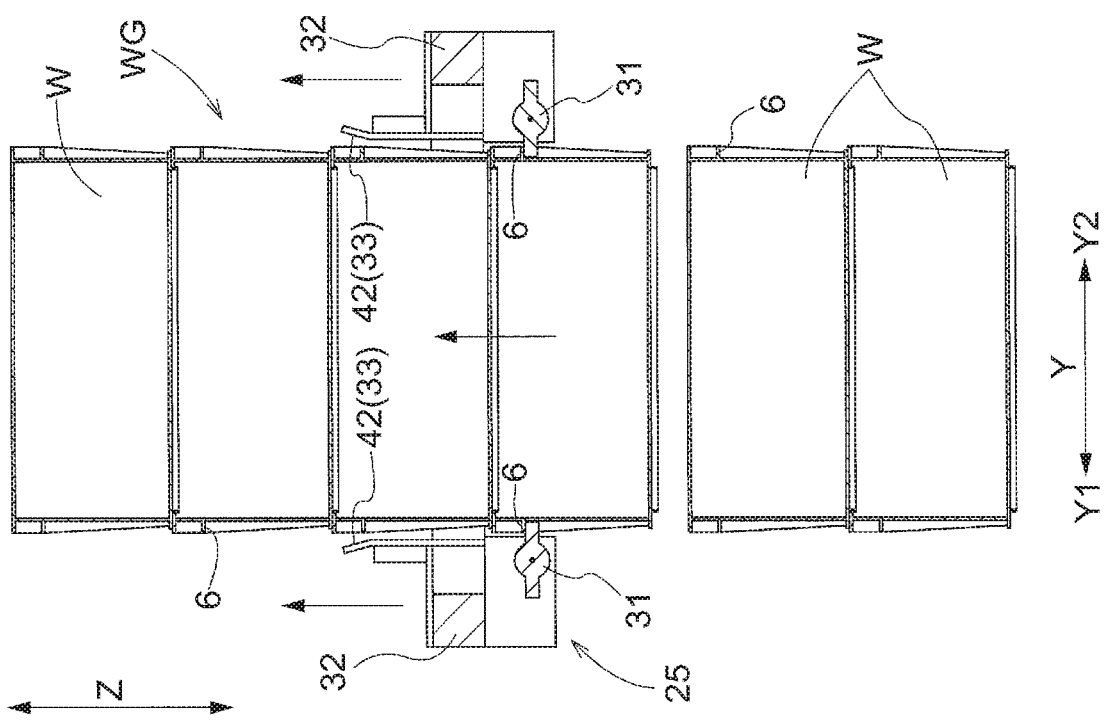
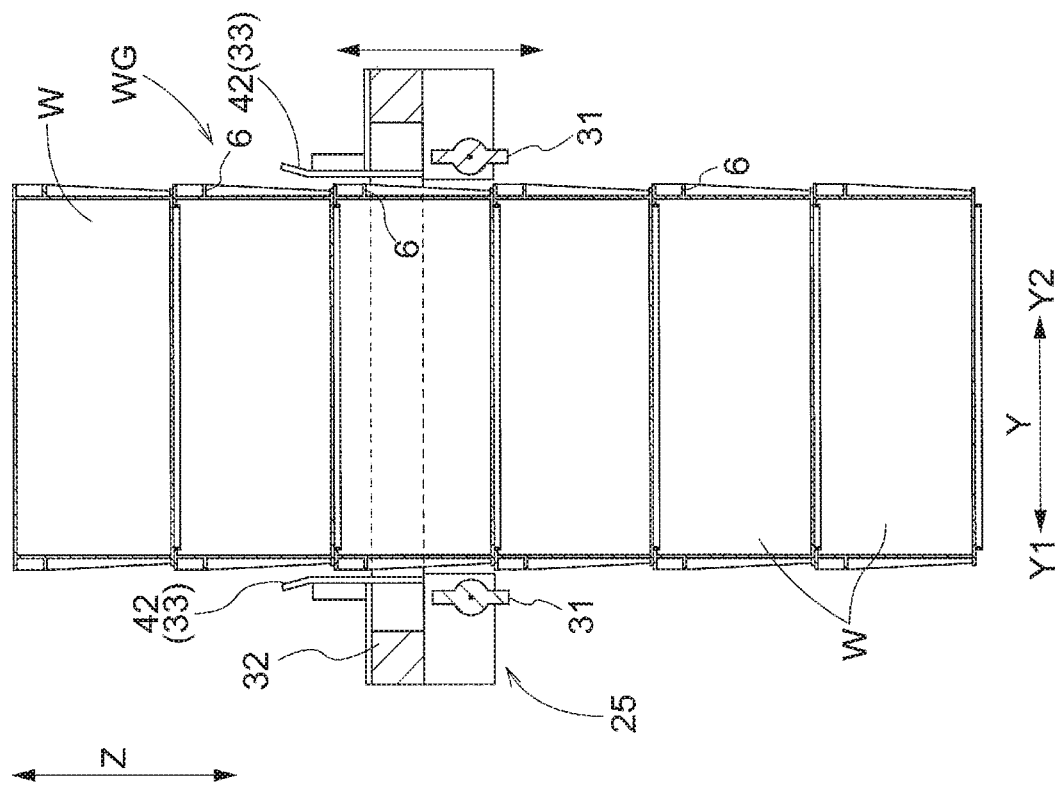

TRANSPORT VEHICLE AND TRANSPORT FACILITY

CROSS-REFERENCE TO RELATED APPLICATIONS

This application is the United States national phase of International Application No. PCT/JP2018/026510 filed Jul. 13, 2018, and claims priority to Japanese Patent Application No. 2017-140912 filed Jul. 20, 2017, the disclosures of which are hereby incorporated by reference in their entirety.

BACKGROUND OF THE INVENTION

The present invention relates to a transport vehicle that travels along a container shelf provided with a plurality of levels of shelf portions arranged in the vertical direction and configured to support containers, thereby transporting the containers, and also relates to a transport facility provided with a plurality of such transport vehicles.

Description of Related Art

An example of the above sort of transport facility is described in JP 2004-277062A (Patent Document 1). A transport vehicle provided in the transport facility of Patent Document 1 is provided with a transfer robot 6 that inserts/takes a container into/out of a container shelf. When performing container transport, the transport vehicle uses the transfer robot 6 to remove the container from the container shelf while the transport vehicle is in a state stopped in front of the container shelf, and travels to the front of another container shelf in a state where the transfer robot 6 is supporting the container, and then stores the container being supported by the transfer robot 6 on that other container shelf.

SUMMARY OF THE INVENTION

When performing container transport, the above-described transport vehicle travels in a state where the transfer robot 6 is supporting a container that was removed from a container shelf, so only one container can be transported at a time. Therefore, it is not possible to efficiently transport containers to container shelves using this transport vehicle, or to efficiently transport containers from container shelves using this transport vehicle.

Consequently, realization of a transport vehicle that can efficiently transport containers, and a transport facility provided with a plurality of such transport vehicles, is desired.

A transport vehicle according to the present disclosure travels along a container shelf provided with a plurality of levels of shelf portions arranged in a vertical direction and configured to support containers, thereby transporting the containers.

The containers are configured to be stackable in the vertical direction. The transport vehicle is provided with a support region where the containers are supported in a stacked state, a transfer apparatus that transfers the containers supported by the shelf portions to the support region and transfers the containers supported in the support region to the shelf portions, and a lifting mechanism that lifts a container at any height among a container group stacked in the support region with respect to a container lower than the container at that any height.

According to this configuration, by the transfer apparatus removing a container that is being supported on a shelf portion and moving that container to the support region, it is possible to stack the container in the support region. Also, the transfer apparatus can transfer an uppermost container in the container group in the support region to a shelf portion. In this way, it is possible for a plurality of the containers removed from a plurality of the shelf portions to be supported in the support region, and it is possible for a plurality of the containers to be transferred to the shelf portions to be supported in the support region. Therefore, it is possible to efficiently transport the containers to the container shelf using this transport vehicle, and it is possible to efficiently transport the containers from the container shelf using this transport vehicle.

Also, the lifting mechanism that lifts a container at any height among a container group in the support region is provided. With this lifting mechanism, it is possible to lift a container at any height, and possible to lift a container that has been stacked on the container at that any height. By lifting a container with the lifting mechanism in this way, with the transfer apparatus it is possible to remove a container that is being supported on a shelf portion and transfer that container to any position in the container group stacked in the support region. Also, with the transfer apparatus, it is possible to transfer a container at any position among the container group stacked in the support region to a shelf portion.

In this way, a container at any position among the stacked container group can be transferred to a storage shelf. Therefore, it is possible to transfer the containers to the shelf portions regardless of the order of the stacked containers, and as a result it is possible to efficiently transport the containers to the container shelf using this transport vehicle.

BRIEF DESCRIPTION OF THE DRAWINGS

FIG. 5 is a vertical front view of the lifting mechanism showing a state in which support portions have been set to a support position.

FIG. 6 is a vertical front view of the lifting mechanism showing a state in which the support portions have been set to an evacuated position.

DESCRIPTION OF THE INVENTION

1. Embodiment

An embodiment of a transport facility provided with a plurality of transport vehicles will be described with reference to the drawings.

Figure 1:
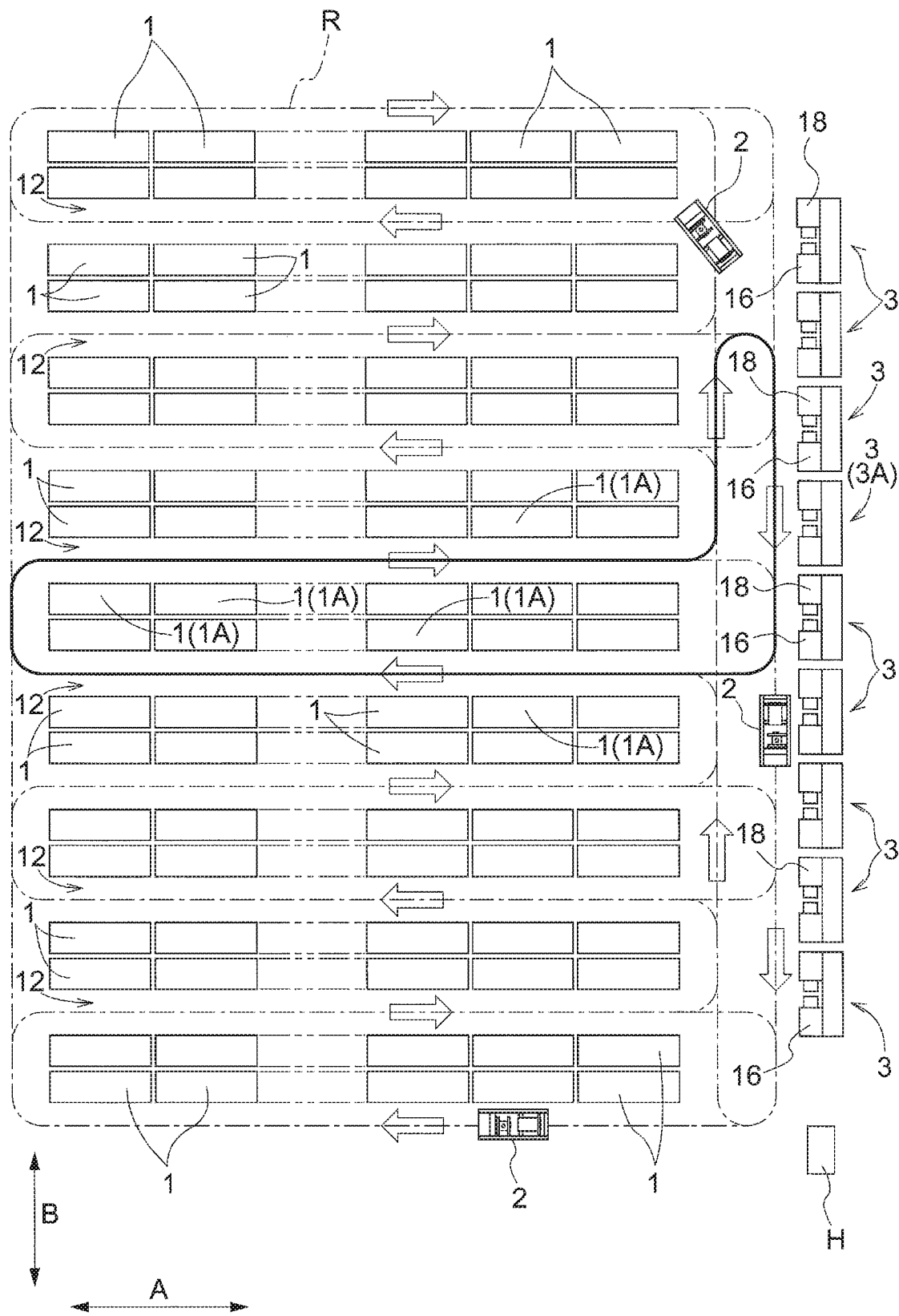
FIG. 1 is a plan view of a transport facility.

As shown in FIG. 1, the transport facility includes a plurality of container shelves 1 that accommodate containers W, a plurality of transport vehicles 2 that transport the containers W, carry-in/carry-out units 3 that perform carry-in transport and carry-out transport of a container group WG in which the containers W have been stacked in a vertical direction Z, and a control apparatus H that controls the plurality of transport vehicles 2.

Figure 2:
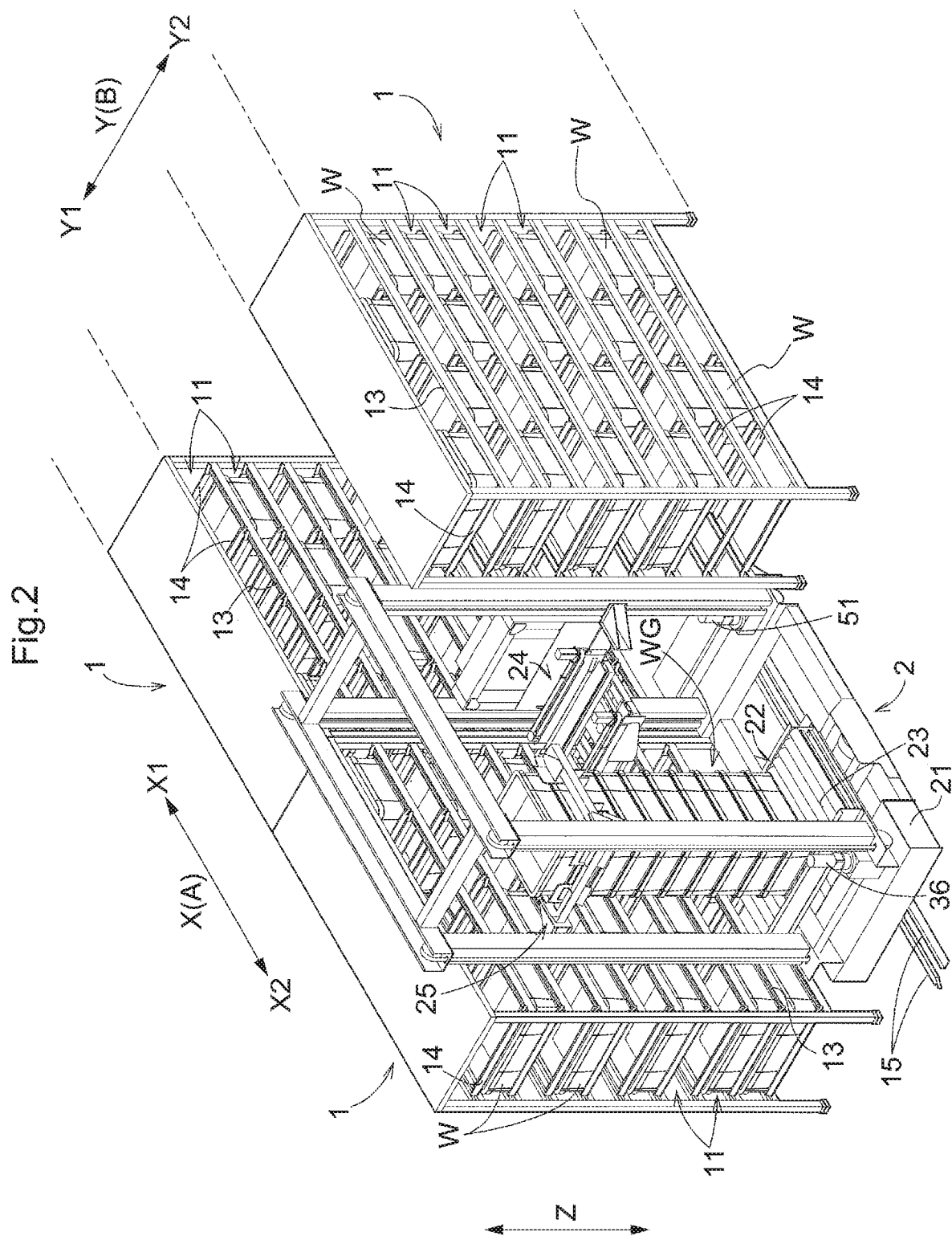
FIG. 2 is a perspective view of a transport vehicle and container shelves.
Figure 3:
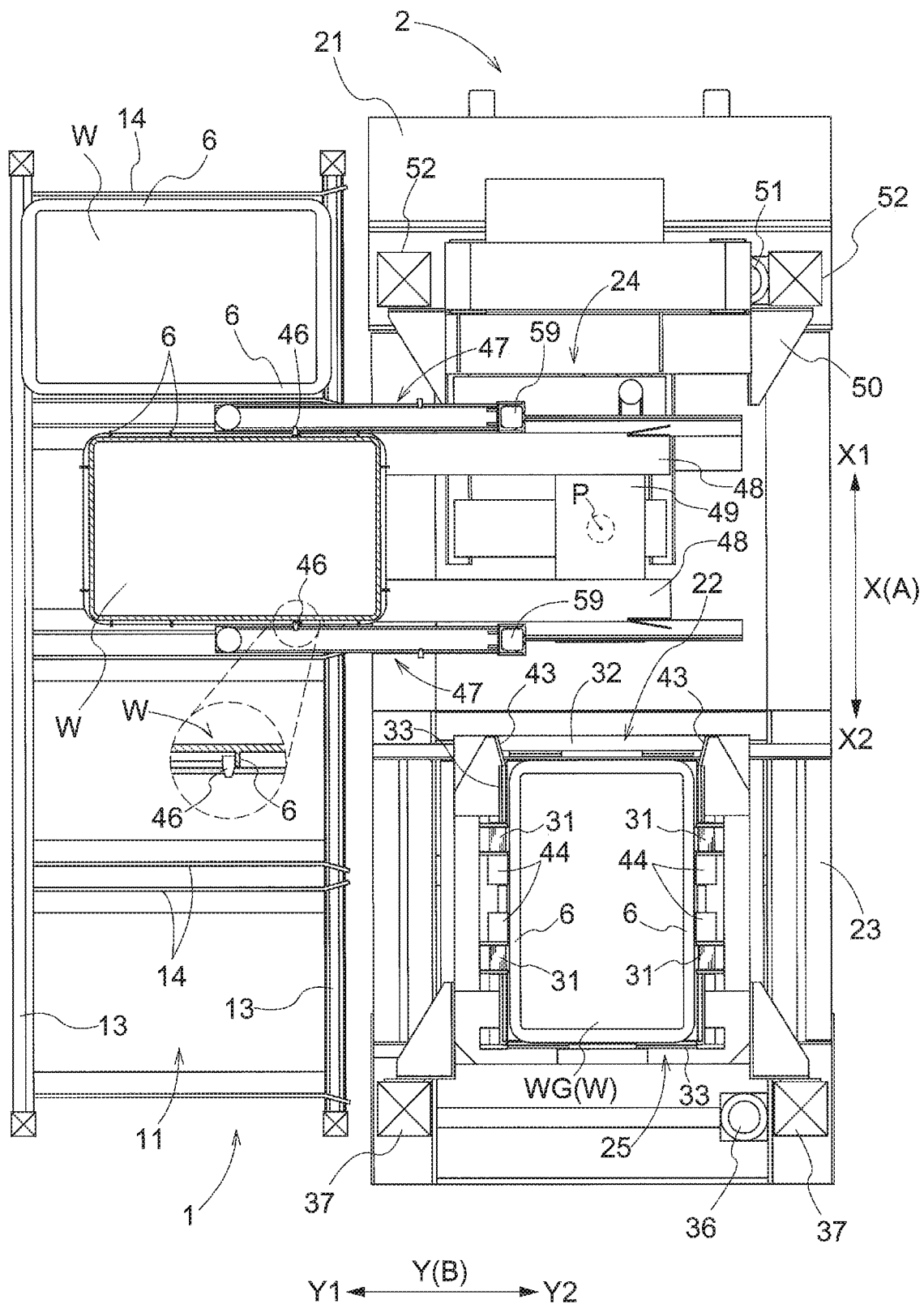
FIG. 3 is a plan view of the transport vehicle and the container shelves.
Figure 4:
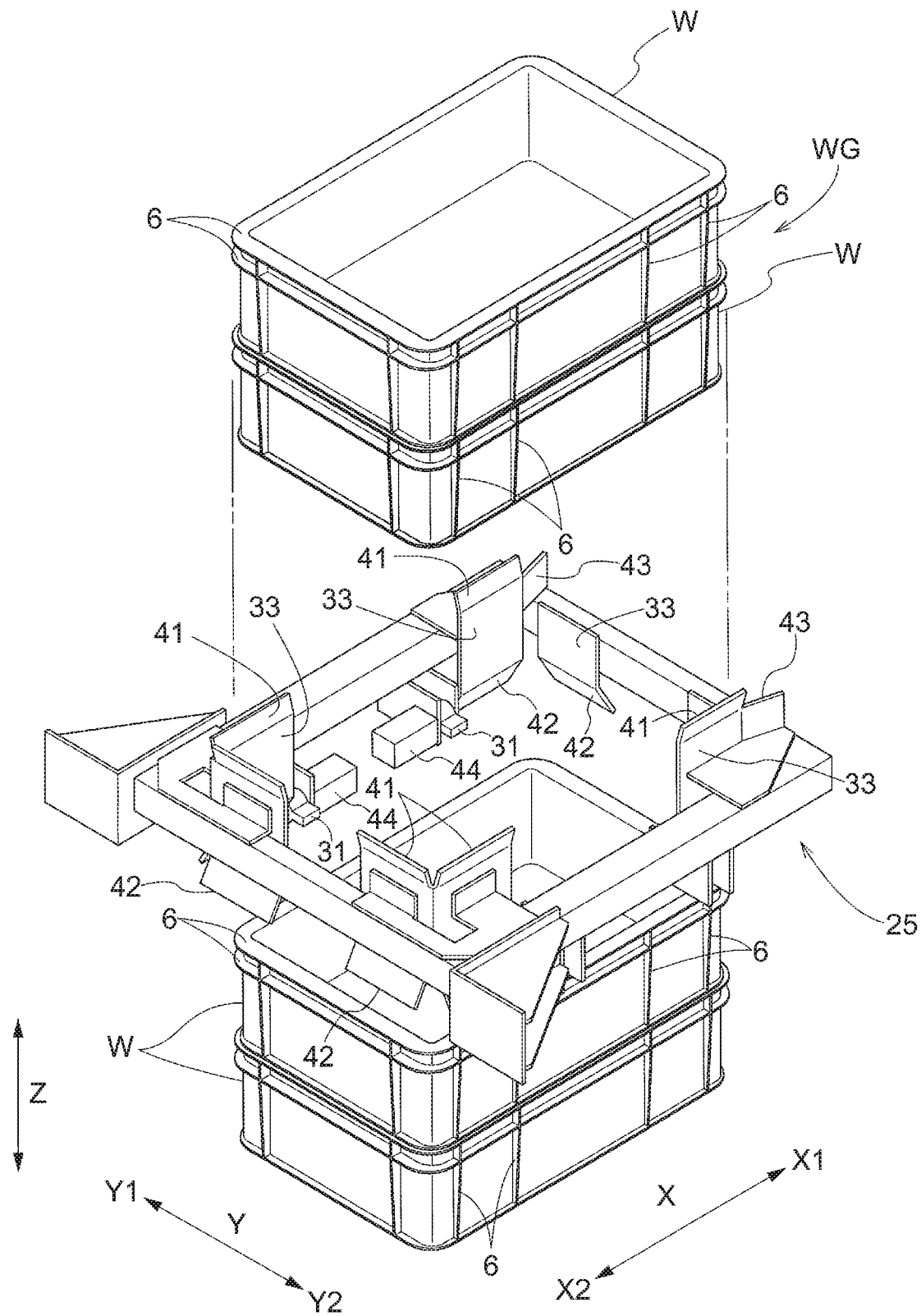
FIG. 4 is a perspective view of a lifting mechanism.

As shown in FIGS. 2 and 4, each container W is formed by erecting side wall portions at the periphery of a bottom portion, and is formed in a box shape with an open upper face. In this example, a non-deformable container configured with a resin material is used as the container W. Side wall portions of the container W are provided with protruding portions 6 (ribs) formed in a longitudinal direction of the container W, and protruding portions 6 (ribs) formed in the vertical direction Z of the container W. In this example, by holding portions 46 of the container transfer apparatus 24 engaging with the protruding portions 6, the container W can be moved in the horizontal direction or lifted by the container transfer apparatus 24. Note that the container W being transferred by the container transfer apparatus 24 in FIG. 3 is shown partly cut away in a cross-section in order to show the protruding portions 6 formed in the vertical direction Z.

As shown in FIGS. 2 and 4, an upper end portion of the container W and a lower end portion of another container W are configured to be capable of fitting together in the vertical direction Z, and thus the containers W are configured to be capable of stacking in the vertical direction Z. Incidentally, the containers W are configured such that when the containers W are stacked, an accommodating space is formed between the bottom portion of one container W and the bottom portion of another container W that has been stacked above that one container W, and a container W can be stacked in a state where an article has been accommodated in the container W.

Container Shelf

The container shelf 1 is provided with a plurality of levels of shelf portions 11 arranged in the vertical direction Z and configured to support the containers W. A plurality of the containers W that are not stacked can be supported on the shelf portions 11 in a state lined up in a shelf width direction A of the container shelf 1.

As shown in FIG. 1, a plurality of the container shelves 1 are installed in an attitude following along the shelf width direction A. Two of the container shelves 1 whose front faces oppose each other are installed in a state spaced apart from each other in a shelf depth direction B. An inter-shelf passageway 12 is formed between these two container shelves 1, and the inter-shelf passageway 12 is used as a passageway through which the transport vehicles 2 travel. The plurality of container shelves 1 in an attitude following along the shelf width direction A are lined up in the shelf depth direction B, and the plurality of container shelves 1 are disposed such that a plurality of the inter-shelf passages 12 are formed. When a transport vehicle 2 travels through an inter-shelf passageway 12, the transport vehicle 2 travels along the front face of the container shelves 1. Incidentally, an inter-shelf passageway 12 is not formed between two container shelves 1 whose rear faces are facing each other.

A direction following along the longitudinal direction of the container shelves 1 is referred to as the shelf width direction A, and a direction perpendicular to the shelf width direction A when viewed from the vertical direction Z is referred to as the shelf depth direction B. Also, a face of the container shelf 1 that faces the inter-shelf passageway 12 is referred to as a front face, and a face on the opposite side as the face of the container shelf 1 that faces the inter-shelf passageway 12 is referred to as a rear face.

As shown in FIG. 2, the shelf portion 11 is provided with a first restriction body 13 and a second restriction body 14. The first restriction body 13 is provided so as to be positioned on both sides in the shelf depth direction B with respect to the container W supported by the shelf portion 11, and the second restriction body 14 is provided so as to be positioned on both sides in the shelf width direction A with respect to the container W supported by the shelf portion 11. The container W supported by the shelf portion 11 is restricted from moving in the shelf depth direction B by the first restriction body 13, and is restricted from moving in the shelf width direction A by the second restriction body 14.

At the front of the shelf portion 11, a guide rail 15 is installed in the shelf width direction A. The transport vehicle 2, which travels along the front of the shelf portion 11, travels in the shelf width direction A through the inter-shelf passageway 12 in a state in which movement in the shelf depth direction B is restricted by the guide rail 15.

The carry-in/carry-out unit 3 is provided with a carry-in unit 16 and a carry-out unit 18. A container group WG in which a plurality of the containers W (carry-in containers W1) have been stacked in the vertical direction Z is carried into the carry-in unit 16. The containers W constituting the container group WG that have been carried into the carry-in unit 16 are stored on a plurality of the container shelves 1 by the transport vehicle 2. Also, the transport vehicle 2 stacks the containers W (carry-out containers W2) that have been removed from the plurality of container shelves 1 in the vertical direction Z to form the container group WG, and transports the container group WG to the carry-out unit 18. Note that a container W to be accommodated on the container shelf 1 is referred to as a carry-in container W1, and a container W that was removed from the container shelf 1 is referred to as a carry-out container W2.

Transport Vehicle

As shown in FIGS. 2 and 3, the transport vehicle 2 is provided with a traveling unit 21 that travels on the floor, a conveyor 23 installed in a support region 22 where the containers W are supported in a stacked state and that supports the containers W in the support region 22, a container transfer apparatus 24 that transfers the containers W, and a lifting mechanism 25 that lifts a container W at any height among the container group WG stacked in the support region 22 with respect to a container W lower than the container W at that any height. The container transfer apparatus 24 is installed in a state adjacent to the support region 22 on a front-rear direction first side X1 when the transport vehicle 2 travels along the front face of the container shelf 1. The container transfer apparatus 24 transfers the containers W supported by the shelf portions 11 to the support region 22, and transfers the containers W supported in the support region 22 to the shelf portions 11. In the following description of the transport vehicle 2, in a state where the transport vehicle 2 is positioned in the inter-shelf passageway 12, that is, in a state in which the transport vehicle 2 is traveling along the front face of the container shelf 1, the direction following along the shelf width direction A is referred to as a front-rear direction X, a direction to one side in the front-rear direction X is referred to as a front-rear direction first side X1, and a direction to the opposite side as the front-rear direction first side X1 is referred to as a front-rear direction second side X2. Also, the direction following along the shelf depth direction B and orthogonal to the front-rear direction X when viewed from the vertical direction Z is referred to as a left-right direction Y, a direction to one side in the left-right direction Y is referred to as a left-right direction first side Y1, and a direction to the opposite side as the left-right direction first side Y1 is referred to as a left-right direction second side Y2.

The container group WG in the support region 22 is supported on a transport face of the conveyor 23. That is, in the transport vehicle 2, the support region 22 where the containers W are supported in a stacked state is formed on the conveyor 23.

The conveyor 23 is installed so as to transport the container group WG in the left-right direction Y. Therefore, the container group WG of the carry-in unit 16 can be transported on the conveyor 23 by operating the conveyor 23 in a state where the transport vehicle 2 has been stopped such that the carry-in unit 16 is adjacent to the transport vehicle 2 in the left-right direction Y. Also, the container group WG on the conveyor 23 can be transported to the carry-out unit 18 by operating the conveyor 23 in a state where the transport vehicle 2 has been stopped such that the carry-out unit 18 is adjacent to the transport vehicle 2 in the left-right direction Y.

Lifting Mechanism

As shown in FIG. 4, the lifting mechanism 25 lifts a container W at any height among the container group WG supported in the support region 22 with respect to a container W lower than the container W at that any height. The lifting mechanism 25 is provided with support portions 31 that support the container W, a raising/lowering unit 32 that supports the support portions 31 and moves in the vertical direction Z, and guide portions 33 that guide the container W in the support region 22 to an appropriate position.

The raising/lowering unit 32 is configured using a frame constructed in a rectangular shape when viewed from the vertical direction Z, and is positioned so as to surround the container W in the support region 22 when viewed from the vertical direction Z. The raising/lowering unit 32 moves in the vertical direction Z along first masts 37 erected on the traveling unit 21 due to driving by a first motor 36.

As shown in FIG. 4, the guide portions 33 are supported by the raising/lowering unit 32, and when the raising/lowering unit 32 is moved in the vertical direction Z, the guide portions 33 come into contact with the container W in the support region 22 and guide the container W to an appropriate position in the support region 22. More specifically, the guide portions 33 are provided with first guide portions 41 and second guide portions 42. The first guide portions 41 are provided in a part of the guide portions 33 that protrudes upward from the raising/lowering unit 32. The second guide portions 42 are provided in a part of the guide portions 33 that protrudes downward from the raising/lowering unit 32. The first guide portions 41 are provided so as to be positioned on the front-rear direction second side X2 and on both sides in the left-right direction Y with respect to the container W at an appropriate position when viewed from vertical direction Z. The second guide portions 42 are provided so as to be positioned on both sides in the front-rear direction X and on both sides in the left-right direction Y with respect to the container W at an appropriate position when viewed from the vertical direction Z.

The first guide portions 41 are provided with an inclined face that slopes away from the container W at an appropriate position toward the upper side. When the raising/lowering unit 32 moves upward, in a case where a container W displaced in the horizontal direction from the appropriate position exists in the container group WG in the support region 22, the inclined face of the first guide portions 41 comes into contact with the container W and guides the container W to the side of the appropriate position. As a result, the container W displaced from the appropriate position can be moved to the appropriate position.

Also, the second guide portions 42 are provided with an inclined face that slopes away from the container W at an appropriate position toward the lower side. When the raising/lowering unit 32 moves downward, when a container W displaced in the horizontal direction from the appropriate position exists in the container group WG in the support region 22, the inclined face of the second guide portions 42 comes into contact with the container W and guides the container W to the side of the appropriate position. As a result, the container W displaced from the appropriate position can be moved to the appropriate position.

Note that the appropriate position of the container W is a position of the container W set in advance in the support region 22, and the appropriate positions of the plurality of containers W in a stacked state are the same position when viewed from the vertical direction Z.

Figure 10:
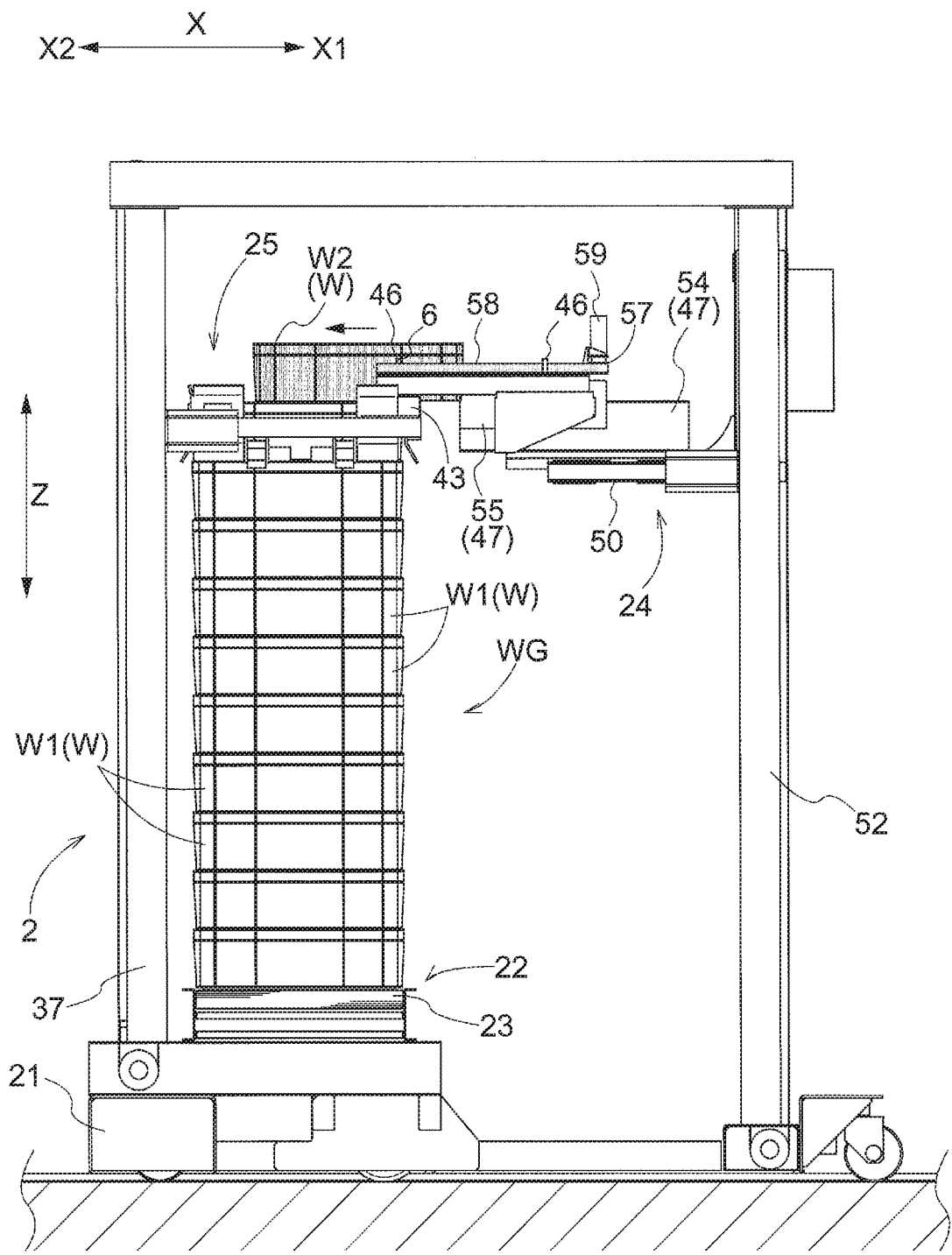
FIG. 10 is a side view of the transport vehicle showing a state in which a carry-out container is loaded in a container group.

The lifting mechanism 25 is provided with a third guide portion 43. The third guide portion 43 is supported by the raising/lowering unit 32 so as to be positioned above the raising/lowering unit 32. The third guide portion 43 is provided with an inclined face that slopes away from the container W at an appropriate position in the left-right direction Y toward the front-rear direction first side X1. As shown in FIG. 10, when loading the container W in the container group WG in the support region 22 using the container transfer apparatus 24, in a case where the container W is displaced in the left-right direction Y from the appropriate position, the inclined face of the third guide portion 43 comes into contact with the container W and moves the container W to the appropriate position in the left-right direction Y.

As shown in FIGS. 4 to 6, the support portions 31 are configured to be movable between a support position (see FIGS. 4 and 5) where the support portions 31 overlap the protruding portions 6 of the container W in the support region 22 when viewed from the vertical direction Z, and an evacuated position (see FIG. 6) where the support portions 31 do not overlap the container W in the support region 22 when viewed from the vertical direction Z. More specifically, the support portions 31 are formed in a plate shape in which the center bulges outward, and by rotating around an axis in the front-rear direction X due to driving by a second motor 44, the support portions 31 move between the support position where the support portions 31 is rotated to be arranged along the front-rear direction X and the left-right direction Y, and the evacuated position where the support portions 31 is rotated to be arranged along the front-rear direction X and the vertical direction Z.

As shown in FIG. 6, by setting the support portions 31 to the evacuated position, the lifting mechanism 25 can prevent the support portions 31 from contacting the container group WG in the support region 22 when the raising/lowering unit 32 is moved in the vertical direction Z.

Also, as shown in FIG. 5, in a state in which the raising/lowering unit 32 has been moved to a height that corresponds to any container W among the container group WG in the support region 22, the lifting mechanism 25 moves the support portions 31 from the evacuated position to the support position and then raises the raising/lowering unit 32. As a result, the support portions 31 engage with the protruding portions 6 of that any container W, and that any container W can be lifted. At this time, in a case where another container W is stacked above that any container W, it is possible to lift both that any container W and the other container W that is stacked above that any container W. In this way, the lifting mechanism 25 can collectively lift any container W among the container group WG stacked in the support region 22 and a container W that is above that any container W.

The lifting mechanism 25, by lowering the raising/lowering unit 32 from the state in which the container W has been lifted, is able to stack one or a plurality of the containers W that are supported in the support portion 31 onto the conveyor 23. Also, in a case where a container W exists in the support region 22 of the conveyor 23, the lifting mechanism 25 can stack the one or a plurality of containers W that are supported in the support portion 31 onto the container W that exists in the support region 22 of the conveyor 23.

Container Transfer Apparatus

Figure 7:
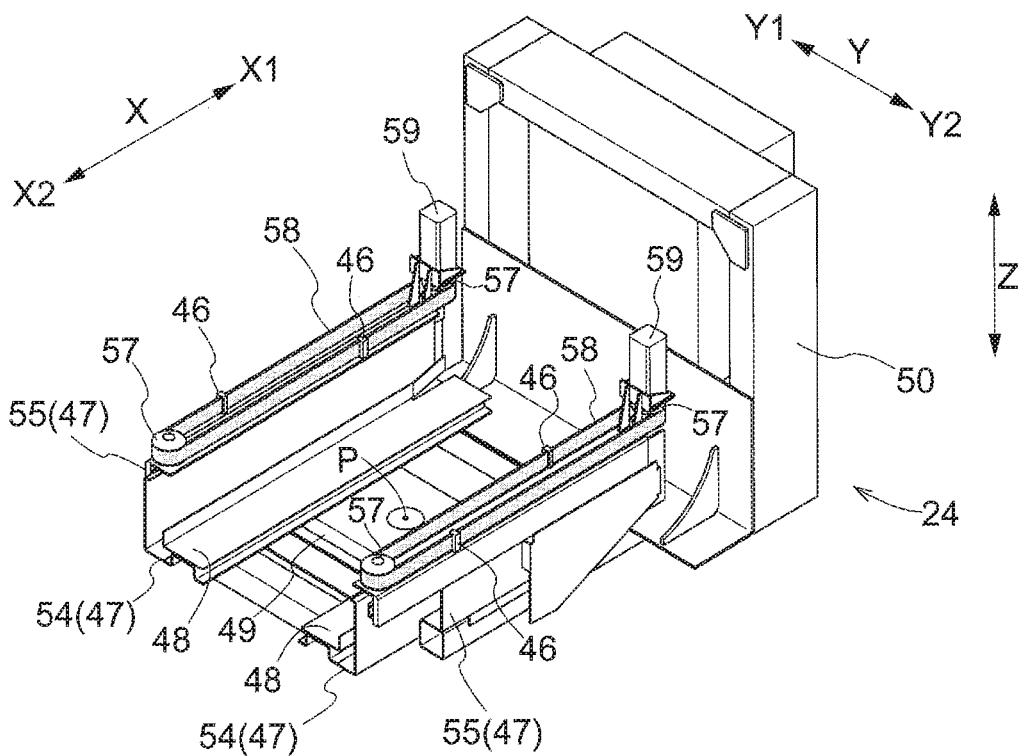
FIG. 7 is a perspective view of a transfer apparatus showing a state in which holding portions are withdrawn.
Figure 8:
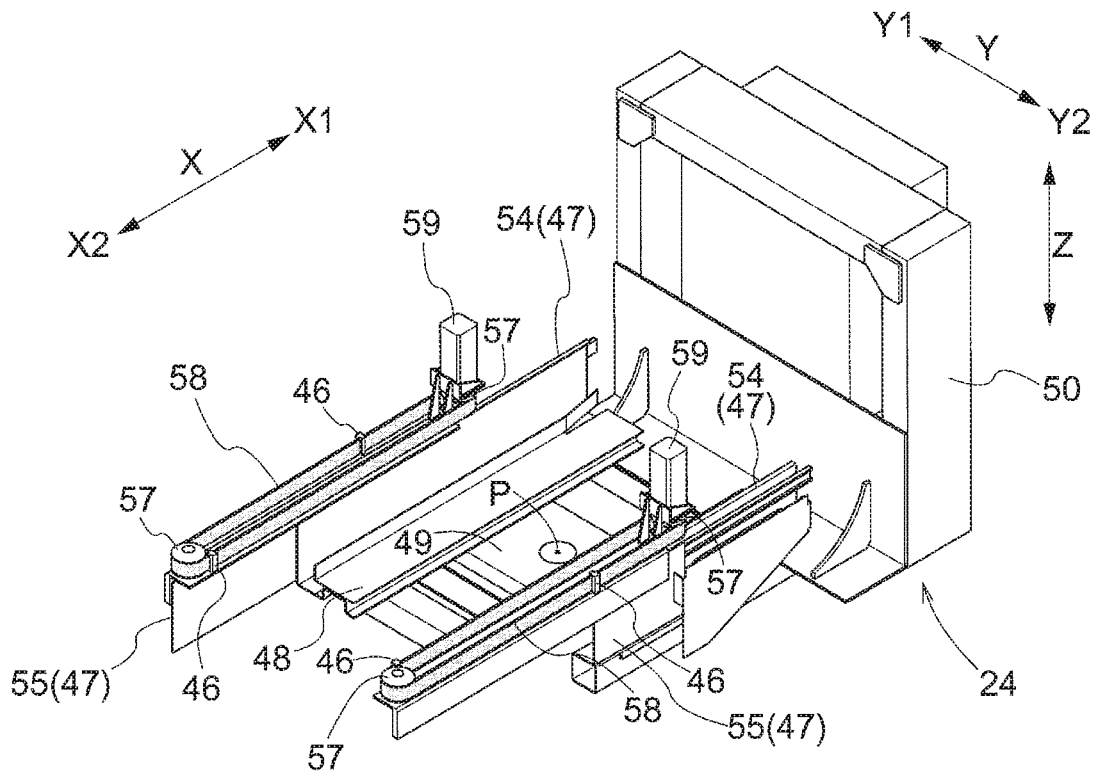
FIG. 8 is a perspective view of the transfer apparatus showing a state in which the holding portions are protruding.

As shown in FIGS. 7 and 8, the container transfer apparatus 24 is provided with holding portions 46 that hold a container W, projecting/retracting portions 47 that support the holding portions 46 and are capable of projecting and retracting in the horizontal direction, support bodies 48 that support the bottom face of the container W from below, a rotating portion 49 that supports the projecting/retracting portions 47 and the support bodies 48 and is rotatable around a vertical axis in the vertical direction Z, and a base portion 50 that supports the rotating portion 49. A pair of the holding portions 46 and a pair of the projecting/retracting portions 47 are provided in a state aligned in a direction perpendicular to the projecting/retracting direction of the projecting/retracting portions 47 when viewed from the vertical direction Z. In the present embodiment, the container transfer apparatus 24 corresponds to a "transfer apparatus".

Figure 9:
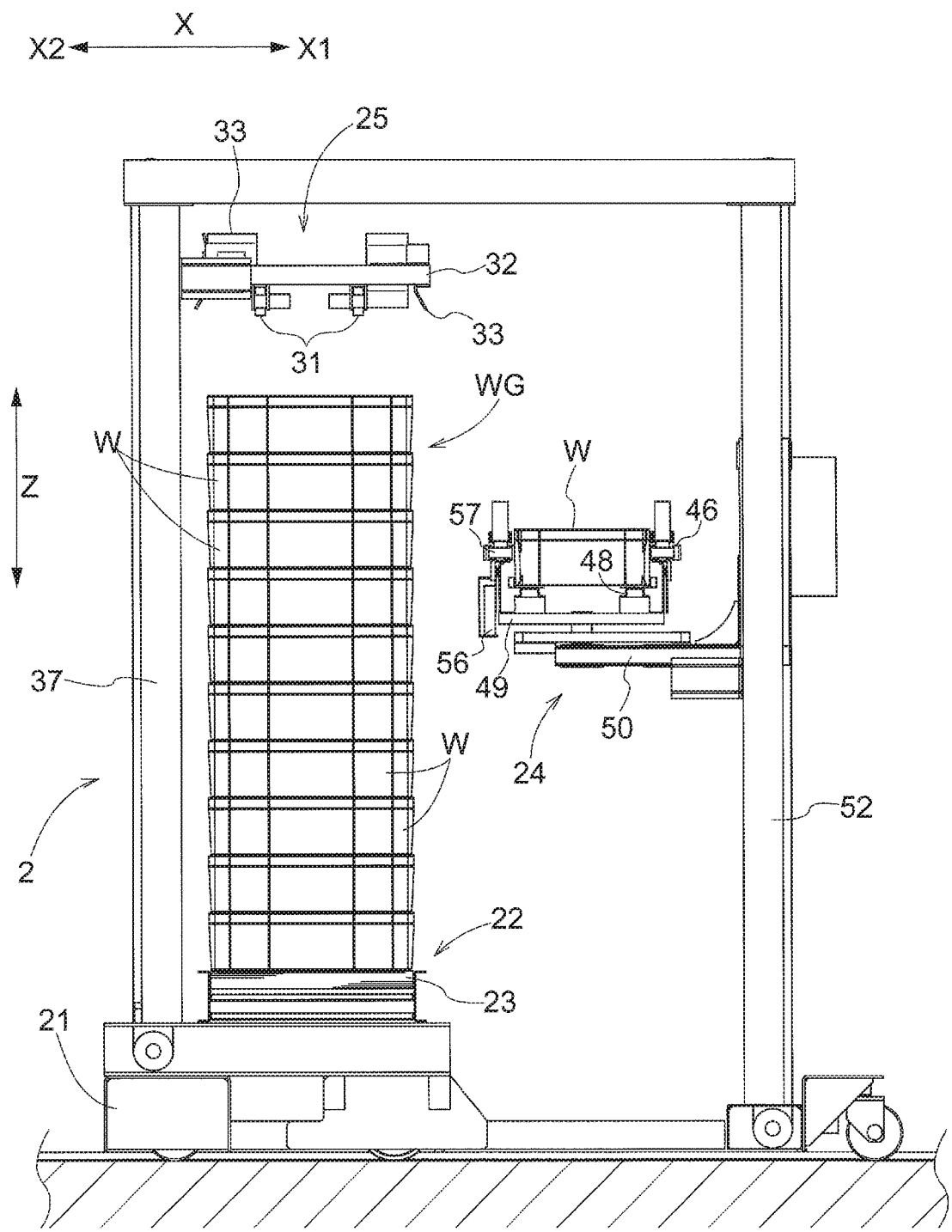
FIG. 9 is a side view of the transport vehicle.

As shown in FIG. 9 and the subsequent drawings, the container transfer apparatus 24 is configured to be capable of being raised/lowered, from a height where a container W supported by the support bodies 48 is positioned lower than a lowermost container W of the container group WG supported on the conveyor 23, to a height where a container W supported by the support bodies 48 is positioned higher than an uppermost container W of the container group WG in which a prescribed number (10 in the present embodiment) of the containers W have been stacked on the conveyor 23. Also, the container transfer apparatus 24 is configured to be capable of being raised/lowered to a height (a transfer height) that corresponds to the respective shelf portions 11 provided in the container shelf 1. The transfer height that corresponds to the lowermost shelf portion 11 is set to a height where a container W is supported by the support bodies 48, at a height lower than the lowermost container W of the container group WG supported on the conveyor 23.

The base portion 50 moves in the vertical direction Z along second masts 52 erected on the traveling unit 21 due to driving by the third motor 51. The base portion 50 supports the holding portions 46 in a state in which the rotating portion 49 and the projecting/retracting portions 47 are interposed between the base portion 50 and the holding portions 46, and by the base portion 50 being moved in the vertical direction Z by the third motor 51, the holding portions 46 are moved in the vertical direction Z. Note that the third motor 51 corresponds to a vertical drive unit that moves the holding portions 46 in the vertical direction Z.

The rotating portion 49 rotates around a vertical axis P in the vertical direction Z due to driving by an internal motor. The rotating portion 49 supports the projecting/retracting portions 47, and by the rotating portion 49 rotating around the vertical axis P, the projecting/retracting portions 47 rotate around the vertical axis, whereby the direction in which the holding portions 46 protrude according to the projecting/retracting portions 47 is changed around the vertical axis P. Specifically, by the rotating portion 49 rotating around the vertical axis P, the direction in which the holding portions 46 protrude according to the projecting/retracting portions 47 can be changed between at least the left-right direction first side Y1, the left-right direction second side Y2, and the front-rear direction second side X2. Note that the rotating portion 49 corresponds to a rotational drive unit that rotates the projecting/retracting portions 47 around the vertical axis P to change the direction in which the holding portions 46 protrude according to the projecting/retracting portions 47. In the following description, the state of the container transfer apparatus 24 where the direction in which the holding portions 46 protrude is set to the left-right direction first side Y1 is referred to as a first shelf transfer state, the state of the container transfer apparatus 24 where the direction in which the holding portions 46 protrude is set to the left-right direction second side Y2 is referred to as a second shelf transfer state, and the state of the container transfer apparatus 24 where the direction in which the holding portions 46 protrude is set to the front-rear direction second side X2 is referred to as a stacked transfer state.

Each of the pair of projecting/retracting portions 47 is provided with a fixing portion 54 supported by the rotating portion 49, a moving portion 55 that moves to project and retract in the horizontal direction with respect to the fixing portion 54, and a fourth motor 56 that moves the moving portion 55 to project and retract in the horizontal direction with respect to the fixing portion 54. The moving portion 55 is provided with a belt 58 wound around a pair of pulleys 57 that are rotatable around an axial center in the vertical direction Z, and a fifth motor 59 that rotationally drives one of the pair of pulleys 57. A holding portion 46 is fixed to each belt 58.

Due to projecting/retracting movement of the moving portion 55 by the fourth motor 56 and rotation of the belt 58 by the fifth motor 59, the projecting/retracting portions 47 move the holding portions 46 in the horizontal direction, thereby moving the holding portions 46 between a withdrawn position (see FIG. 7) and a protruding position (see FIG. 8) in which the holding portions 46 have been caused to protrude in the horizontal direction from the withdrawn position. Note that the projecting/retracting portions 47 correspond to a horizontal drive unit that moves the holding portions 46 in the horizontal direction.

Also, at both ends of the belt 58 (both ends in the left-right direction Y in the attitude shown in FIG. 3 and both ends in the front-rear direction X in the attitude shown in FIGS. 7 and 8), due to the holding portions 46 moving along the outer peripheral face of the pulleys 57, the distance between the holding portion 46 supported by one projecting/retracting portion 47 and the holding portion 46 supported by the other projecting/retracting portion 47 can be changed. The distance between the pair of holding portions 46 can be changed between an engagement interval at which the pair of holding portions 46 engage with the container W, and a separation interval at which the pair of holding portions 46 separate from the container W. Note that "holding the container with the pair of holding portions 46" indicates that when the holding portions 46 have been moved to project or retract, the holding portions 46 engage with the protruding portions 6 of the container W and thus it is possible to move the container W, so it is not necessary to hold the container W sandwiched between the pair of holding portions 46.

A case where a container W being supported in the support region 22 is transferred to the support bodies 48 by the container transfer apparatus 24 will be described with reference to FIGS. 11 and 13.

The container transfer apparatus 24 first rotates the rotating portion 49 around the vertical axis P, sets the container transfer apparatus 24 to the stacked transfer state, and raises/lowers the base portion 50 to raise/lower the container transfer apparatus 24 to the transfer height that corresponds to the container W to be transferred in the support region 22. Then, after switching the container transfer apparatus 24 from the withdrawn state (the state in which the holding portions 46 are positioned in the withdrawn position) to the protruding state (the state in which the holding portions 46 are positioned in the protruding position), the interval between the pair of holding portions 46 is changed from the separation interval to the engagement interval, and thus the container W is held by the pair of holding portions 46. Afterward, the holding portions 46 are moved to the withdrawn position, and the container W in the support region 22 is transferred to the support bodies 48. Note that in a case where the container W to be transferred is stacked on another container W, after the container W to be transferred is held by the pair of holding portions 46, the base portion 50 is raised to release that container W from fitting together with a container W that is adjacent below at least the front end of the container W to be transferred, and then the holding portions 46 are moved to the withdrawn position. Also, in a case where another container W is stacked on the container W to be transferred, transfer is performed by the container transfer apparatus 24 in a state in which the other container W above the container W to be transferred has been lifted by the lifting mechanism 25.

Next, a case where a container W being supported by the support bodies 48 is transferred to the support region 22 by the container transfer apparatus 24 will be described with reference to FIGS. 10 and 12.

The container transfer apparatus 24 first rotates the rotating portion 49 around the vertical axis P, sets the container transfer apparatus 24 to the stacked transfer state, and raises/lowers the base portion 50 to raise/lower the container transfer apparatus 24 to the transfer height in the support region 22. Then, in a state in which the container W is being held by the pair of holding portions 46 at the engagement interval, after switching the container transfer apparatus 24 from the withdrawn state to the protruding state, the container W being supported by the support bodies 48 is stacked on a container W in the support region 22. Afterward, the interval between the pair of holding portions 46 is changed from the engagement interval to the separation interval to release holding of the container W to be transferred, and then the holding portions 46 are moved to the withdrawn position. Note that in a case where a container W does not exist in the support region 22, the container W to be transferred is transferred onto the conveyor 23. Also, in a case where a container W is to be transferred to a transfer target position at an intermediate position in the stacked container group WG, transfer is performed by the container transfer apparatus 24 in a state in which the container W above the transfer target position has been lifted by the lifting mechanism 25.

In a case where a container W being supported on a shelf portion 11 is to be transferred to the support bodies 48 by the container transfer apparatus 24, or a case where a container W being supported by the support bodies 48 is to be transferred to a shelf portion 11 by the container transfer apparatus 24, the container transfer apparatus 24 is operated in a similar manner as when transferring a container W being supported by the support bodies 48 to the support region 22, other than setting the state of the container transfer apparatus 24 to the first shelf transfer state or the second shelf transfer state instead of the stacked transfer state, or raising the base portion 50 in order to pass over the first restriction body 13 even in a case where the container W to be transferred is not stacked. Therefore, a description of that operation is omitted here.

Control Apparatus

As shown in FIG. 1, the control apparatus H sets a travel route R of a plurality of the transport vehicles 2 and controls the transport vehicles 2 such that the plurality of transport vehicles 2 travel along the travel route R. The travel route R has a route that follows along the shelf width direction A and a route along the shelf depth direction B, and the control apparatus H controls the transport vehicles 2 to travel along the travel route R in one direction. Therefore, in the inter-shelf passageway 12 formed between two of the container shelves 1, the traveling direction of the transport vehicles 2 is one direction. Also, for example, when transporting the containers W between a target carry-in/carry-out unit 3A that is one of the plurality of carry-in/carry-out units 3, and a target container shelf 1A that is part of the plurality of container shelves 1, the control apparatus H controls the transport vehicles 2 by transmitting, to the transport vehicles 2, transport information for traveling along the travel route R indicated by the thick solid line in FIG. 1, and storing and removing the containers W with respect to a plurality of the target container shelves 1A.

Note that, in FIG. 1, the travel route R of the transport vehicles 2 is indicated by dashed-dotted lines and the thick solid line. Also, in FIG. 1, the traveling direction of the transport vehicles 2 is indicated by arrows.

Based on the transport information from the control apparatus H, a control unit provided in a transport vehicle 2 controls the transport vehicle 2 as described below.

First, after controlling the traveling unit 21 such that the transport vehicle 2 stops adjacent to a carry-in unit 16, the conveyor 23 is controlled such that a container group WG, configured with all of its containers W being carry-in containers W1, is loaded from the carry-in unit 16 to the support region 22.

Figure 11:
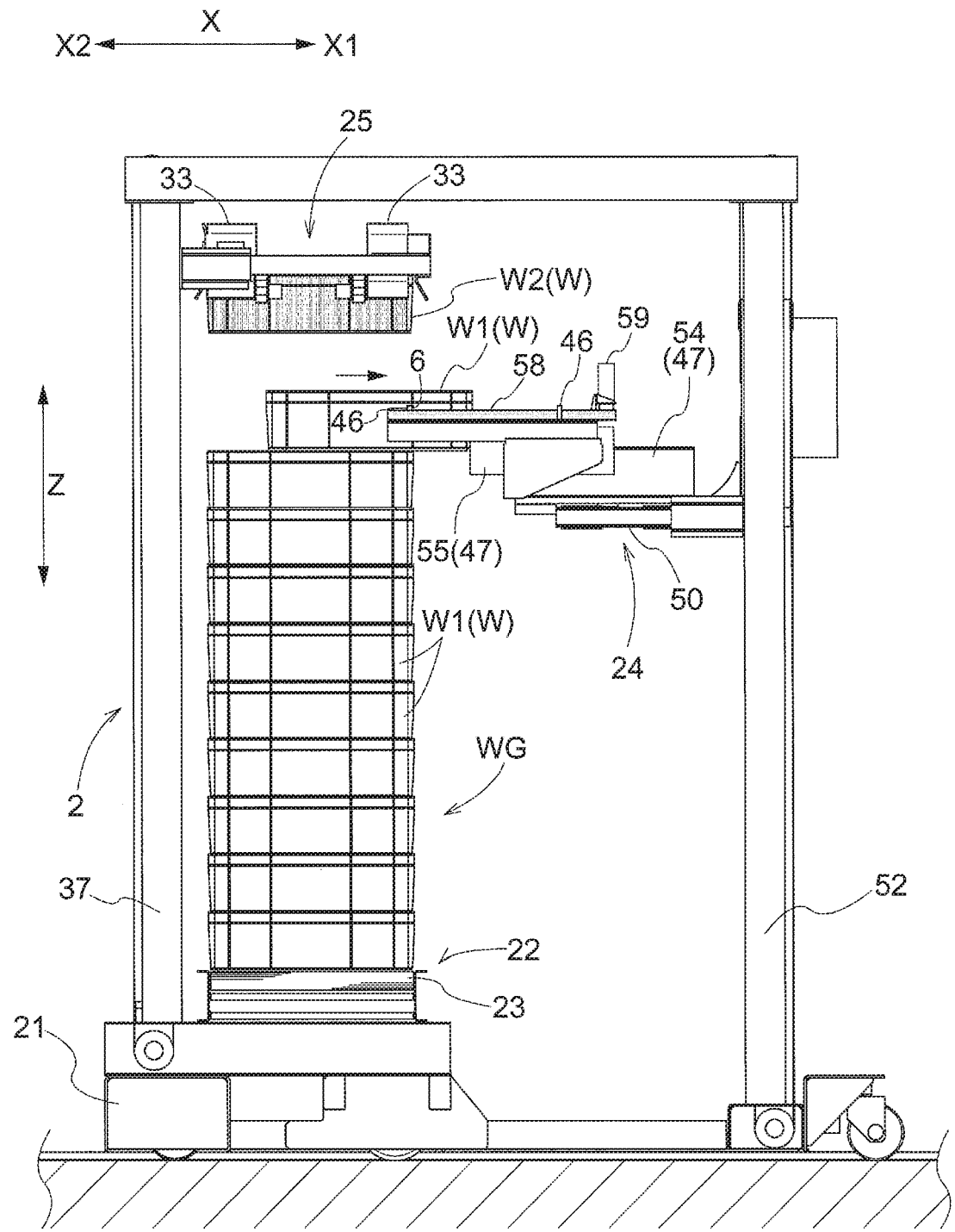
FIG. 11 is a side view of the transport vehicle showing a state in which a carry-in container is removed from the container group.
Figure 12:
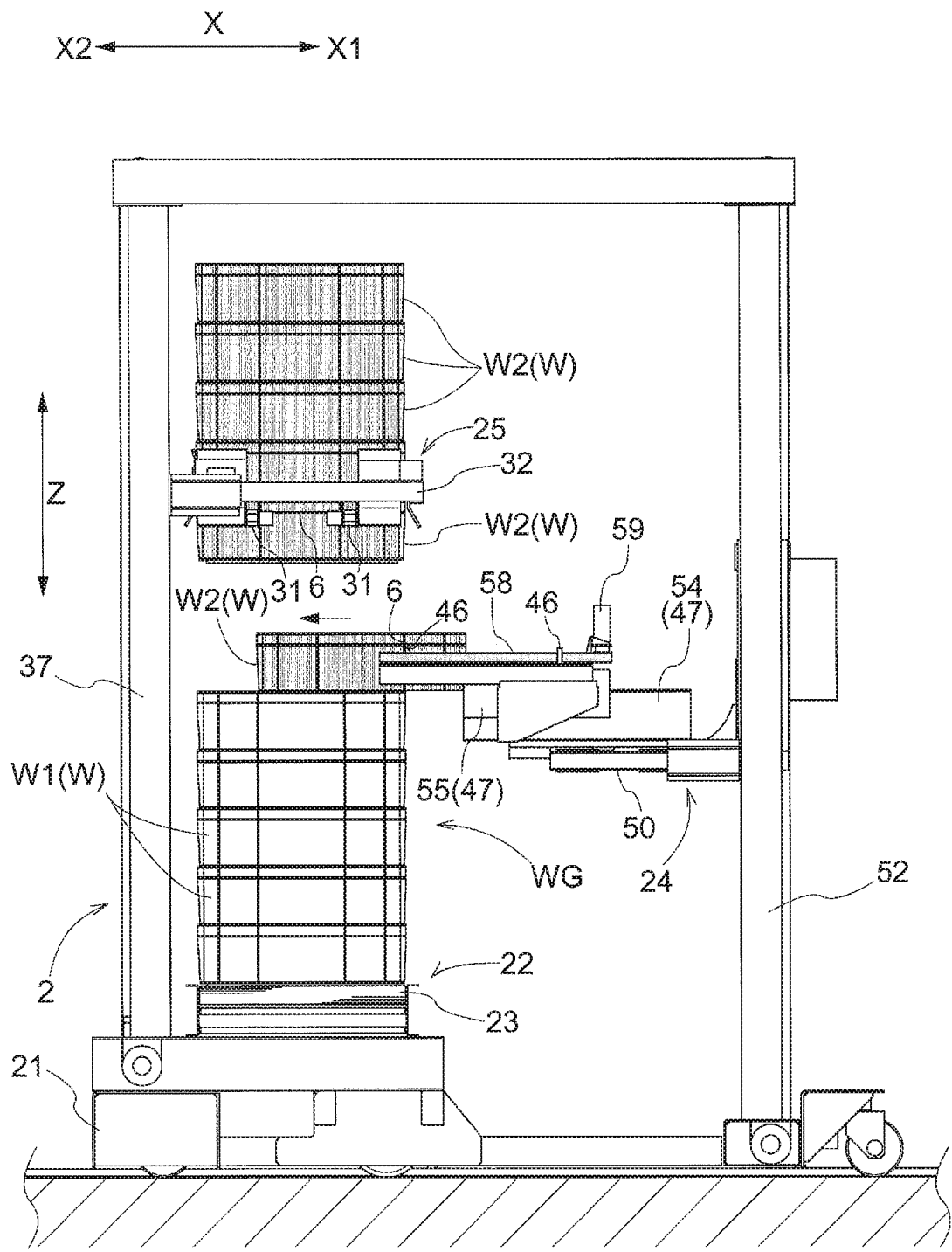
FIG. 12 is a side view of the transport vehicle showing a state in which a carry-out container is loaded in a container group.
Figure 13:
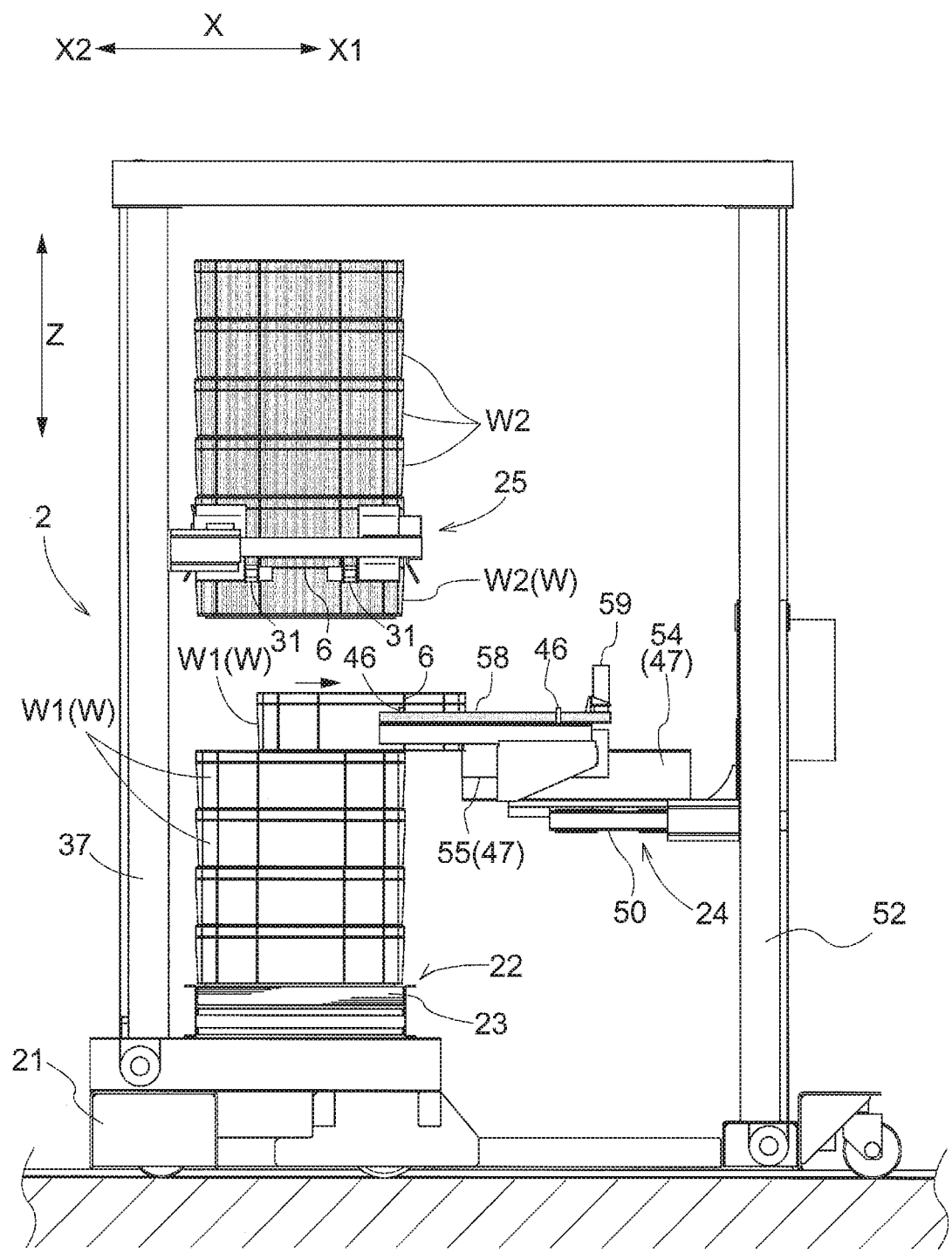
FIG. 13 is a side view of the transport vehicle showing a state in which a carry-in container is removed from the container group.

Then, after controlling the traveling unit 21 such that the transport vehicle 2 stops adjacent to a container shelf 1, as shown in FIGS. 10 and 11, or as shown in FIGS. 12 and 13, the container transfer apparatus 24 and the lifting mechanism 25 are controlled to continually stack carry-out containers W2 in the container group WG in the support region 22 and transfer the carry-in containers W1 from the support region 22, and thus carry-out containers W2 being supported on a shelf portion 11 are transferred to the support region 22, and the carry-in containers W1 in the support region 22 are stored at the position where the carry-out containers W2 were being stored.

By continually stacking the carry-out containers W2 in the container group WG in the support region 22 and transferring the carry-in containers W1 from the support region 22 in this way, every container W of the container group WG being supported in the support region 22 becomes a carry-out container W2.

When every container W of the container group WG in the support region 22 has become a carry-out container W2, after controlling the traveling unit 21 such that the transport vehicle 2 stops adjacent to a carry-out unit 18, the conveyor 23 is controlled such that the container group WG is lowered to the carry-out unit 18.

When transferring a carry-out container W2 that was removed from a shelf portion 11 to the support region 22 with the container transfer apparatus 24, in a case where all of the containers W that constitute the container group WG supported in the support region 22 are carry-in containers W1, as shown in FIG. 10, the control unit controls the container transfer apparatus 24 so as to load the carry-out container W2 on the uppermost container W in the container group WG (the uppermost carry-in container W1 in the support region 22), and transfer the carry-out container W2 to the support region 22. Also, when transferring the carry-out container W2 to the support region 22 in this way, the control unit raises/lowers the lifting mechanism 25 to a height that corresponds to the carry-out container W2. Thus, in a case where the carry-out container W2 is displaced from the appropriate position in the left-right direction Y, that carry-out container W2 is guided toward the appropriate position by the third guide portion 43.

As shown in FIG. 10, by loading the carry-out container W2 on the container group WG in which all of the containers W are carry-in containers W1, the uppermost container W of the container group WG becomes the carry-out container W2. When transferring the carry-out container W2 that was removed from the shelf portion 11 to the support region 22 with the container transfer apparatus 24, in a case where one of the containers W that constitute the container group WG supported in the support region 22 is thus the carry-out container W2, as shown in FIG. 11, the control unit controls the lifting mechanism 25 to lift only the uppermost carry-out container W2, and then controls the container transfer apparatus 24 to store the second container W from the top (the uppermost carry-in container W1 in the support region 22) on the shelf portion 11.

Also, as shown in FIG. 12, when transferring the carry-out container W2 that was removed from the shelf portion 11 to the support region 22 with the container transfer apparatus 24, in a case where some (in FIG. 12, five) of the containers W that constitute the container group WG supported in the support region 22 are carry-out containers W2, the control unit controls the lifting mechanism 25 to lift all of the carry-out containers W2 in the stacked container group WG, and then controls the container transfer apparatus 24 to transfer the removed carry-out container W2 onto the uppermost remaining carry-in container W1 in the support region 22 without lifting.

Also, as shown in FIG. 13, when transferring a carry-in container W1 from the support region 22 with the container transfer apparatus 24, some (in FIG. 13, six) of the containers W that constitute the container group WG supported in the support region 22 are carry-out containers W2, so the control unit controls the lifting mechanism 25 to lift the carry-out containers W2, and also controls the container transfer apparatus 24 to transfer the carry-in container W1 that is positioned uppermost among the carry-in containers W1 in the support region 22 from the support region 22.

2. Other Embodiments

Next, other embodiments of the transport vehicle and the transport facility will be described.

(1) In the above embodiment, both transport of a carry-in container W1 and transport of a carry-out container W2 are performed by the transport vehicle 2, but a configuration may also be adopted in which the transport vehicle 2 performs only one of transport of a carry-in container W1 and transport of a carry-out container W2.

(2) In the above embodiment, the container transfer apparatus 24 is installed in a state adjacent to the support region 22 on the front-rear direction first side X1, but the positional relationship between the container transfer apparatus 24 and the support region 22 may be appropriately modified, and for example, the container transfer apparatus 24 may be installed in a state adjacent to the support region 22 on the front-rear direction second side X2, or may be installed in a state adjacent to the support region 22 on the left-right direction second side Y2.

(3) In the above embodiment, the direction in which the projecting/retracting portions 47 protrude is changed by the rotating portion 49 between the left-right direction first side Y1, the left-right direction second side Y2, and the front-rear direction second side X2, but changing of the direction in which the projecting/retracting portions 47 protrude may be appropriately modified. Specifically, for example, when transferring a container W only to/from a container shelf 1 adjacent to the transport vehicle 2 on the left-right direction first side Y1, the direction in which the projecting/retracting portions 47 protrude may be changed by the rotating portion 49 between only the left-right direction first side Y1 and the front-rear direction second side X2. Also, for example, when a support region 22 is formed also on the front-rear direction first side X1 with respect to the container transfer apparatus 24, the direction in which the projecting/retracting portions 47 protrude may be changed by the rotating portion 49 between the left-right direction first side Y1, the left-right direction second side Y2, the front-rear direction first side X1, and the front-rear direction second side X2.

(4) In the above embodiment, the lifting mechanism 25 is provided with the guide portion 33 that guides a container W to the appropriate position in the support region 22, but a configuration may also be adopted in which, in addition to or instead of the guide portion 33, a pressing portion is provided that moves away from/towards the appropriate position, and by moving the pressing portion toward the appropriate position in a state in which the raising/lowering unit 32 has been stopped, a container W in the support region 22 is pressed from the side and thereby moved to the appropriate position.

(5) In the above embodiment, the container group WG in the support region 22 is supported by the transport face of the conveyor 23, but a configuration may also be adopted in which a support base that does not have a transport function is provided in the support region 22, and the container group WG in the support region 22 is supported by an upper face of the support base.

(6) In the above embodiments, the control apparatus H virtually sets the travel route R, except for part of the travel route R, and controls the transport vehicle 2 so as to travel along that travel route R, but a configuration may also be adopted in which a guide rail 15 is installed along all of the travel route R, and the transport vehicle 2 travels along that guide rail 15.

(7) In the above embodiments, the container W is a container W with an open upper face, but it is sufficient that the container W is stackable, and for example, the container W may be a folding container or the like with a lid attached to the upper face of the container such that the lid can be opened/closed.

(8) In the above embodiments, the container transfer apparatus 24 is configured such that the holding portions 46 are engaged with a face facing the left-right direction Y of a container W in the support region 22 in order to transfer the container W, but the configuration of the container transfer apparatus 24 may be appropriately modified. For example, the container transfer apparatus 24 may be configured such that the holding portions 46 are engaged with engagement receiving portions provided in a face facing the front-rear direction first side X1 of the container W in the support region 22 in order to transfer the container W. Also, the container transfer apparatus 24 may be configured such that the container W in the support region 22 is held sandwiched between a pair of the holding portions 46 in the left-right direction Y in order to transfer the container W.

(9) It should be noted that the configurations disclosed in each of the above embodiments can be applied in combination with the configurations disclosed in other embodiments as long as no contradiction arises. Regarding those other configurations as well, the embodiments disclosed in the present specification are merely examples in all respects. Accordingly, various modifications can be made as appropriate in a range that does not depart from the gist of the present disclosure.

3. Summary of the Above Embodiments

Following is a summary of the transport vehicle and the transport facility described above.

A transport vehicle according to the present disclosure travels along a container shelf provided with a plurality of levels of shelf portions arranged in a vertical direction and configured to support containers, thereby transporting the containers.

The containers are configured to be stackable in the vertical direction. The transport vehicle is provided with a support region where the containers are supported in a stacked state, a transfer apparatus that transfers the containers supported by the shelf portions to the support region and transfers the containers supported in the support region to the shelf portions, and a lifting mechanism that lifts a container at any height among a container group stacked in the support region with respect to a container lower than the container at that any height.

According to this configuration, by the transfer apparatus removing a container that is being supported on a shelf portion and moving that container to the support region, it is possible to stack the container in the support region. Also, the transfer apparatus can transfer an uppermost container in the container group in the support region to a shelf portion. In this way, it is possible for a plurality of the containers removed from a plurality of the shelf portions to be supported in the support region, and it is possible for a plurality of the containers to be transferred to the shelf portions to be supported in the support region. Therefore, it is possible to efficiently transport the containers to the container shelf using this transport vehicle, and it is possible to efficiently transport the containers from the container shelf using this transport vehicle.

Also, the lifting mechanism that lifts a container at any height among the container group in the support region is provided. With this lifting mechanism, it is possible to lift a container at any height, and possible to lift a container that has been stacked on the container at that any height. By lifting a container with the lifting mechanism in this way, with the transfer apparatus it is possible remove a container that is being supported on a shelf portion and transfer that container to any position in the container group stacked in the support region. Also, with the transfer apparatus, it is possible to transfer any container among the container group stacked in the support region to a shelf portion.

In this way, any container among the stacked container group can be transferred to a storage shelf by the transfer apparatus. Therefore, it is possible to transfer the containers to the shelf portions regardless of the order of the stacked containers, and as a result it is possible to efficiently transport the containers to the container shelf using this transport vehicle.

Here, it is suitable to adopt a configuration in which the transfer apparatus is provided with a holding portion that holds a container, a horizontal drive unit that moves the holding portion in a horizontal direction, a vertical drive unit that moves the holding portion in the vertical direction, and a rotational drive unit that rotates the horizontal drive unit around a vertical axis in the vertical direction to change the movement direction of the holding portion by the horizontal drive unit around the vertical axis.

According to this configuration, by rotating the horizontal drive unit around the vertical axis with the rotational drive unit, it is possible to change the movement direction of the holding portion by the horizontal drive unit, so it is possible to increase the degree of freedom of the positional relationship of the shelf portions and the support region with respect to the transfer apparatus. Therefore, it is possible to increase the versatility of the transport vehicle.

Also, it is suitable to adopt a configuration in which, where a direction along a front face of the container shelf when viewed from the vertical direction is referred to as a front-rear direction, one side in the front-rear direction is referred to as a front-rear direction first side, the opposite side in the front-rear direction is referred to as a front-rear direction second side, a direction orthogonal to the front-rear direction when viewed from the vertical direction is referred to as a left-right direction, one side in the left-right direction is referred to as a left-right direction first side, and the opposite side in the left-right direction is referred to as a left-right direction second side, in a case where the transport vehicle travels along the front face of the container shelf, the transfer apparatus is installed in a state adjacent to the support region on the front-rear direction first side, the horizontal drive unit moves the holding portion between a withdrawn position and a protruding position where the holding portion is caused to protrude in the horizontal direction from the withdrawn position, and the rotational drive unit rotates the holding portion and the horizontal drive unit around the vertical axis to change the direction in which the holding portion is caused to protrude by the horizontal drive unit between the left-right direction first side, the left-right direction second side, and the front-rear direction second side.

According to this configuration, in a case where the transport vehicle travels along the front face of the container shelf, by setting the direction in which the holding portion is caused to protrude to the left-right direction first side, the transfer apparatus can transfer a container to/from a shelf portion that is adjacent to the transport vehicle on the left-right direction first side. Also, by setting the direction in which the holding portion is caused to protrude to the left-right direction second side, the transfer apparatus can transfer a container to/from a shelf portion that is adjacent to the transport vehicle on the left-right direction second side. Also, by setting the direction in which the holding portion is caused to protrude to the front-rear direction second side, the transfer apparatus can transfer a container to/from the support region.

By configuring the transfer apparatus in this way and installing the transfer apparatus in a state adjacent to the support region on the front-rear direction first side, while reducing the size of the transport vehicle in the left-right direction, a container can be transferred to/from the shelf portions adjacent to the transport vehicle on both sides in the left-right direction.

Also, it is suitable to adopt a configuration in which the transfer apparatus is configured to, in a state in which the holding portion has been raised/lowered to a transfer height that corresponds to a transfer target shelf portion, insert/take a container into/out of that shelf portion, and the transfer height that corresponds to a lowermost shelf portion is set to a height where a container is held by the holding portion, at a position lower than a container disposed lowest in the support region.

According to this configuration, the height of the support portion when inserting/taking a container into/out of the lowermost shelf portion can be a comparatively low height. Therefore, it is possible to reduce the height of the lowermost shelf portion, and as a result, for example, it is possible to increase the number of levels of shelf portions that are lined up in the vertical direction in a container shelf, and as a result it is possible to increase the container shelf storage efficiency.

Also, it is suitable to adopt a configuration in which the lifting mechanism is provided with a support portion that supports a container, a raising/lowering unit that moves the support portion in the vertical direction, and a guide portion that, when the raising/lowering unit has been moved in the vertical direction, contacts a container in the support region and guides that container to an appropriate position in the support region when viewed from the vertical direction.

According to this configuration, each time the lifting mechanism (the raising/lowering unit) is moved in the vertical direction, if there exists a container that is displaced from the appropriate position among the plurality of containers stacked in the support region, then the guide portion contacts and guides that container, and thus the position of the container can be corrected to the appropriate position when viewed from the vertical direction. Therefore, the stacked state of the container group in the support region can be properly maintained.

Also, it is suitable to adopt a configuration in which a conveyor is provided in the support region, and the container group in the support region is supported on a transport face of the conveyor.

According to this configuration, it is possible to collectively transport the container group stacked in the support region. Therefore, it is possible to collectively load/unload the stacked container group between the transport vehicle and a location other than the transport vehicle.

In a transport facility provided with a plurality of transport vehicles, it is suitable that this transport facility includes a plurality of the container shelves, and a control apparatus that sets a travel route of the plurality of transport vehicles, and in this configuration, a passageway of the transport vehicles formed between two of the container shelves adjacent in a shelf depth direction serves as an inter-shelf passageway, and the plurality of container shelves are arranged such that a plurality of the inter-shelf passageways are formed, the control apparatus setting a travel route of each of the transport vehicles such that a travel direction of the transport vehicles in each of the inter-shelf passageways is one direction.

According to this configuration, by forming an inter-shelf passageway between two container shelves, a transport vehicle that travels through the inter-shelf passageway is able to insert/take containers into/out of both of the two container shelves that exist on both sides in a direction perpendicular to the travel route. Also, because the travel route is set such that the travel direction of the transport vehicle is one direction, it is possible to allow a plurality of the transport vehicles to travel smoothly.

INDUSTRIAL APPLICABILITY

The technology according to the present disclosure is applicable to a transport vehicle that transports a container.

DESCRIPTION OF REFERENCE SIGNS

1: container shelf
2: transport vehicle
11: shelf portion
12: inter-shelf passageway
22: support region
23: conveyor
24: container transfer apparatus (transfer apparatus)
25: lifting mechanism
31: support portion
32: raising/lowering unit
33: guide portion
46: holding portion
47: projecting/retracting portion (horizontal drive unit)
49: rotating portion (rotational drive unit)
51: third motor (vertical drive unit)
B: shelf depth direction
H: control apparatus
P: vertical axis
R: travel route
W: container
WG: container group
X: front-rear direction
X1: front-rear direction first side
X2: front-rear direction second side
Y: left-right direction
Y1: left-right direction first side
Y2: left-right direction second side
Z: vertical direction

The invention claimed is:
1. A transport vehicle that travels along a container shelf provided with a plurality of levels of shelf portions arranged in a vertical direction and configured to support containers, thereby transporting the containers, the containers configured to be stackable in the vertical direction and the transport vehicle comprising:
a support region where the containers are supported in a stacked state;

a transfer apparatus that transfers the containers supported by the shelf portions to the support region and transfers the containers supported in the support region to the shelf portions; and a lifting mechanism that lifts a container at any height among a container group stacked in the support region with respect to a container lower than the container at that any height.

2. The transport vehicle according to claim 1, wherein the transfer apparatus is provided with a holding portion that holds a container, a horizontal drive unit that moves the holding portion in a horizontal direction, a vertical drive unit that moves the holding portion in the vertical direction, and a rotational drive unit that rotates the horizontal drive unit around a vertical axis in the vertical direction to change the movement direction of the holding portion by the horizontal drive unit around the vertical axis.

3. The transport vehicle according to claim 2, wherein, where a direction along a front face of the container shelf when viewed from the vertical direction is referred to as a front-rear direction, one side in the front-rear direction is referred to as a front-rear direction first side, the opposite side in the front-rear direction is referred to as a front-rear direction second side, a direction orthogonal to the front-rear direction when viewed from the vertical direction is referred to as a left-right direction, one side in the left-right direction is referred to as a left-right direction first side, and the opposite side in the left-right direction is referred to as a left-right direction second side, in a case where the transport vehicle travels along the front face of the container shelf, wherein the transfer apparatus is installed in a state adjacent to the support region on the front-rear direction first side, wherein the horizontal drive unit moves the holding portion between a withdrawn position and a protruding position where the holding portion is caused to protrude in the horizontal direction from the withdrawn position, and wherein the rotational drive unit rotates the holding portion and the horizontal drive unit around the vertical axis to change the direction in which the holding portion is caused to protrude by the horizontal drive unit between the left-right direction first side, the left-right direction second side, and the front-rear direction second side.

4. The transport vehicle according to claim 2, wherein the transfer apparatus is configured to, in a state in which the holding portion has been raised/lowered to a transfer height that corresponds to a transfer target shelf portion, insert/take a container into/out of that shelf portion, and wherein the transfer height that corresponds to a lowermost shelf portion is set to a height where a container is held by the holding portion, at a position lower than a container disposed lowest in the support region.

5. The transport vehicle according to claim 1, wherein the lifting mechanism is provided with a support portion that supports a container, and further comprising a raising/lowering unit that moves the support portion in the vertical direction, and a guide portion that, when the raising/lowering unit has been moved in the vertical direction, contacts a container in the support region and guides that container to an appropriate position in the support region when viewed from the vertical direction.

6. The transport vehicle according to claim 1, wherein a conveyor is provided in the support region, and wherein the container group in the support region is supported on a transport face of the conveyor.

7. A transport facility provided with a plurality of the transport vehicles according to claim 1, the transport facility comprising:

a plurality of the container shelves; and a control apparatus that sets a travel route of the plurality of transport vehicles;

wherein a passageway of the transport vehicles formed between two of the container shelves adjacent in a shelf depth direction serves as an inter-shelf passageway, and the plurality of container shelves are arranged such that a plurality of the inter-shelf passageways are formed, and wherein the control apparatus sets a travel route of each of the transport vehicles such that a travel direction of the transport vehicles in each of the inter-shelf passageways is one direction.

* * * * *